US012777549B2

(12) United States Patent
Loehr et al.

(10) Patent No.: US 12,777,549 B2
(45) Date of Patent: Oct. 27, 2026

(54) LCH CONFIGURATION FOR SMALL DATA TRANSMISSION

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Hyung-Nam Choi, Ottobrunn (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 452 days.

(21) Appl. No.: 18/256,402

(22) PCT Filed: Dec. 7, 2021

(86) PCT No.: PCT/IB2021/061424
§ 371 (c)(1),
(2) Date: Jun. 7, 2023

(87) PCT Pub. No.: WO2022/123446
PCT Pub. Date: Jun. 16, 2022

(65) Prior Publication Data

US 2024/0023192 A1 Jan. 18, 2024

Related U.S. Application Data

(60) Provisional application No. 63/122,283, filed on Dec. 7, 2020.

(51) Int. Cl.
*H04W 76/27* (2018.01)
*H04W 74/0833* (2024.01)
*H04W 74/0836* (2024.01)

(52) U.S. Cl.
CPC ........ *H04W 76/27* (2018.02); *H04W 74/0833* (2013.01); *H04W 74/0836* (2024.01)

(58) Field of Classification Search
CPC ............. H04W 76/27; H04W 74/0833; H04W 74/083
See application file for complete search history.

(56) References Cited

U.S. PATENT DOCUMENTS

2018/0309660 A1* 10/2018 Loehr .................. H04W 28/04
2019/0174571 A1 6/2019 Deenoo et al.
2021/0259040 A1* 8/2021 Babaei .................. H04W 72/23
(Continued)

OTHER PUBLICATIONS

3GPP TS 38.321 V16.2.1 (Sep. 2020), (Year: 2020).*
(Continued)

*Primary Examiner* — Mohammed S Chowdhury
(74) *Attorney, Agent, or Firm* — Kunzler Needham Hilton

(57) ABSTRACT

Apparatuses, methods, and systems are disclosed for configuring logical channel ("LCH") mapping restriction for small-data transmission. One apparatus includes a transceiver that receives a configuration with LCH mapping restrictions for an LCH. The apparatus includes a processor applies a first set of LCH mapping restrictions for uplink transmissions when the first apparatus is in a Radio Resource Control ("RRC") connected state and applies a second set of LCH mapping restrictions for uplink transmissions when the first apparatus is in a RRC inactive state, where the LCH mapping restrictions of the first set are different than the LCH mapping restrictions of the second set.

16 Claims, 9 Drawing Sheets

(56) References Cited

U.S. PATENT DOCUMENTS

| | | | | |
|---|---|---|---|---|
| 2021/0315049 | A1* | 10/2021 | Wei | H04W 76/27 |
| 2023/0038013 | A1* | 2/2023 | Shi | H04W 76/27 |
| 2023/0262814 | A1* | 8/2023 | Agiwal | H04W 76/30<br>370/329 |
| 2023/0389117 | A1* | 11/2023 | Laselva | H04W 74/08 |

OTHER PUBLICATIONS

3GPP TSG RAN WG2 Meeting #112-e; R2-2008995; Source: Intel Corporation; Title: Handling of Configured grant for SDT; Electronic meeting, Nov. 2-13, 2020. (Year: 2020).*

3GPP TSG-RAN WG2 Meeting #112 Electronic; R2-2009350; Source: Nokia, Nokia Shanghai Bell; Title: Discussion on aspects specific to CG based SDT; Elbonia, Nov. 2-13, 2020 (Year: 2020).*

3GPP TSG-RAN2 Meeting #112 Electronic; R2-2009094; Source: Samsung; Title: Configured Grant based Small Data Transmission; Nov. 2-Nov. 13, 2020 (Year: 2020).*

PCT/IB2021/061424, "Notification of Transmittal of the International Search Report and the Written Opinion of the International Searching Authority, or the Declaration", International Searching Authority, Feb. 18, 2022, pp. 1-12.

Vivo, "Discussion on RRC-controlled small data transmission", 3GPP TSG-RAN WG2 Meeting #112-electronic R2-2008959, Nov. 2-13, 2020, pp. 1-6.

Intel Corp., "Handling of Configured grant for SDT", 3GPP TSG RAN WG2 Meeting #112-e R2-2008995, Nov. 2-13, 2020, pp. 1-4.

Ericsson, "RRC aspects for SDT", 3GPP TSG-RAN WG2 #112e Tdoc R2-2009966, Nov. 2-13, 2020, pp. 1-5.

3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.

3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.

3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.

3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

* cited by examiner

```
-- ASN1START
-- TAG-LOGICALCHANNELCONFIG-START

LogicalChannelConfig ::=            SEQUENCE {
    ul-SpecificParameters               SEQUENCE {
        priority                            INTEGER (1..16),
        prioritsedBitRate                   ENUMERATED {  kBps0, kBps8, kBps16, kBps32, kBps64, kBps128, kBps256, kBps512,
                                                          kBps1024, kBps2048, kBps4096, kBps8192, kBps16384, kBps3278,
                                                          kBps65536, infinity },
        bucketSizeDuration                  ENUMERATED {  ms5, ms10, ms20, ms50, ms100, ms150, ms300, ms500, ms1000, spare7,
                                                          spare6, spare5, spare4, spare3, spare2, spare1 },
        allowedServingCells                 SEQUENCE ( SIZE (1..maxNrofServingCells-1)) OF ServCellIndex
                                                                                  OPTIONAL,    -- PDCP-CADuplication
        allowedSCS-List                     SEQUENCE ( SIZE (1..maxSCSs)) OF SubcarrierSpacing        OPTIONAL,    -- Need R
        maxPUSCH-Duration                   ENUMERATED {  ms0p02, ms0p04, ms0p0625, ms0p125, ms0p25, ms0p5, spare2, spare1 }
                                                                                              OPTIONAL,    -- Need R
        configuredGrantType1Allowed         ENUMERATED {  true }                              OPTIONAL,    -- Need R
        allowedSDT-LCH                      BOOLEAN,
        logicalChannelGroup                 INTEGER (0.. maxLCG-ID)                           OPTIONAL,    -- Need R
        schedulingRequestID                 SchedulingRequestID                               OPTIONAL,    -- Need R
        logicalChannelSR-Mask               BOOLEAN,
        logicalChannelSR-DelayTimerApplied  BOOLEAN,
        ...,
        bitRateQuestProhibitTimer           ENUMERATED {  s0, s0dot4, s0dot8, s1dot6, s3, s6, s12, s30 }   OPTIONAL, -- Need R
        [[
        allowedCG-List-r16                  SEQUENCE ( SIZE (0..maxNrofConfiguredGrantConfigMAC-r16-1) OF
                                                          ConfiguredGrantConfigIndexMAC-r16   OPTIONAL,    -- Need S
        allowedPHY-PriorityIndex-r16        ENUMERATED {  p0, p1 }                            OPTIONAL,    -- Need S
        ]]
    }
    ...,
    [[
    channelAccessPriority-r16               INTEGER (1..4)                                    OPTIONAL,    -- Need R
    bitRateMultiplier-r16                   ENUMERATED {  x40, x70, x100, x200}               OPTIONAL     -- Need R
    ]],
}

-- TAG-LOGICALCHANNELCONFIG-STOP
-- ASN1STOP
```

405

400

FIG. 4

```
rrc-ConfiguredUplinkGrant            SEQUENCE {
   timeDomainOffset                    INTEGER (0..5119),
   timeDomainAllocation                INTEGER  (0..15),
   frequencyDomainAllocation           BIT STRING (SIZE(18)),
   antennaPort                         INTEGER (0..31),
   dmrs-SeqInitialization              INTEGER (0..1)                                   OPTIONAL,   -- Need R
   precodingAndNumberOfLayers          INTEGER (0..63),
   srs-ResourceIndicator               INTEGER (0..15)                                  OPTIONAL,   -- Need R
   mcsAndTBS                           INTEGER (0..31),
   frequencyHoppingOffset              INTEGER (1.. maxNrofPhysicalResourceBlocks-1)    OPTIONAL,   -- Need R
   pathlossReferenceIndex              INTEGER (0..maxNrofPUSCH-PathlossReferenceRSs-1),
   ...,
   [[
   pusch-RepTypeIndicator-r16           ENUMERATED {pusch-RepTypeA,pusch-RepTypeB}      OPTIONAL,   -- Need M
   frequencyHoppingPUSCH-RepTypeB-r16   ENUMERATED {interRepetition, interSlot}         OPTIONAL,   -- Cond
RepTypeB
   timeReferenceSFN-r16                 ENUMERATED {sfn512}                             OPTIONAL    -- Need S
   ]],
   [[
   sdt-LCHonly-r17                      ENUMERATED {on, off}   505                      OPTIONAL    -- Need S
   ]]
   }                                                                                    OPTIONAL,   -- Need R
```

500

FIG. 5

LCH CONFIGURATION FOR SMALL DATA TRANSMISSION

CROSS-REFERENCE TO RELATED APPLICATIONS

This application claims priority to U.S. Provisional Patent Application No. 63/122,283 entitled "UPLINK TRANSMISSION PROCEDURE FOR SMALL DATA TRANSMISSIONS IN RRC_INACTIVE" and filed on Dec. 7, 2020 for Joachim Loehr, Prateek Basu Mallick, Hyung-Nam Choi, and Ravi Kuchibhotla, which application is incorporated herein by reference.

FIELD

The subject matter disclosed herein relates generally to wireless communications and more particularly relates to uplink ("UL") transmission procedure for small-data transmission ("SDT") by a User Equipment ("UE") in an RRC inactive mode.

BACKGROUND

Sidelink communication refers to peer-to-peer communication directly between User Equipment ("UE") devices. Accordingly, the UEs communicate with one another without the communications being relayed via the mobile network (i.e., without the need of a base station).

BRIEF SUMMARY

Disclosed are procedures for supporting uplink transmission for small data while in RRC_INACTIVE state. Said procedures may be implemented by apparatus, systems, methods, or computer program products.

One method of a User Equipment ("UE") for configuring logical channel ("LCH") mapping restriction for SDT includes receiving a configuration with LCH mapping restrictions for a LCH and applying a first set of LCH mapping restrictions for uplink transmissions when the UE is in a Radio Resource Control ("RRC") connected state (i.e., the RRC_CONNECTED state). The method includes applying a second set of LCH mapping restrictions for uplink transmissions when the UE is in an RRC inactive state (i.e., RRC_INACTIVE state), where the LCH mapping restrictions of the first set and the LCH mapping restrictions of the second set are different One method of a Radio Access Network ("RAN") node for configuring LCH mapping restriction for SDT includes transmitting, to a UE, a first set of LCH mapping restrictions for a LCH and transmitting, to the UE, a second set of LCH mapping restrictions for an LCH. Here, the first set of LCH mapping restriction applies when the UE is in an RRC connected state (i.e., RRC_CONNECTED state) and the second set of LCH mapping restriction applies when the UE is in an RRC inactive state (i.e., RRC_INACTIVE state), where the LCH mapping restrictions of the first set and the LCH mapping restrictions of the second set are different. The method includes receiving, from the UE, a small-data transmission while the UE is in the RRC inactive state

BRIEF DESCRIPTION OF THE DRAWINGS

A more particular description of the embodiments briefly described above will be rendered by reference to specific embodiments that are illustrated in the appended drawings.

Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of Abstract Syntax Notation 1 ("ASN.1") form for a LogicalChannelConfig message;

FIG. 5 is a diagram illustrating one embodiment of ASN.1 form for an rrc-ConfiguredUplinkGrant information element;

DETAILED DESCRIPTION

Figure 1:
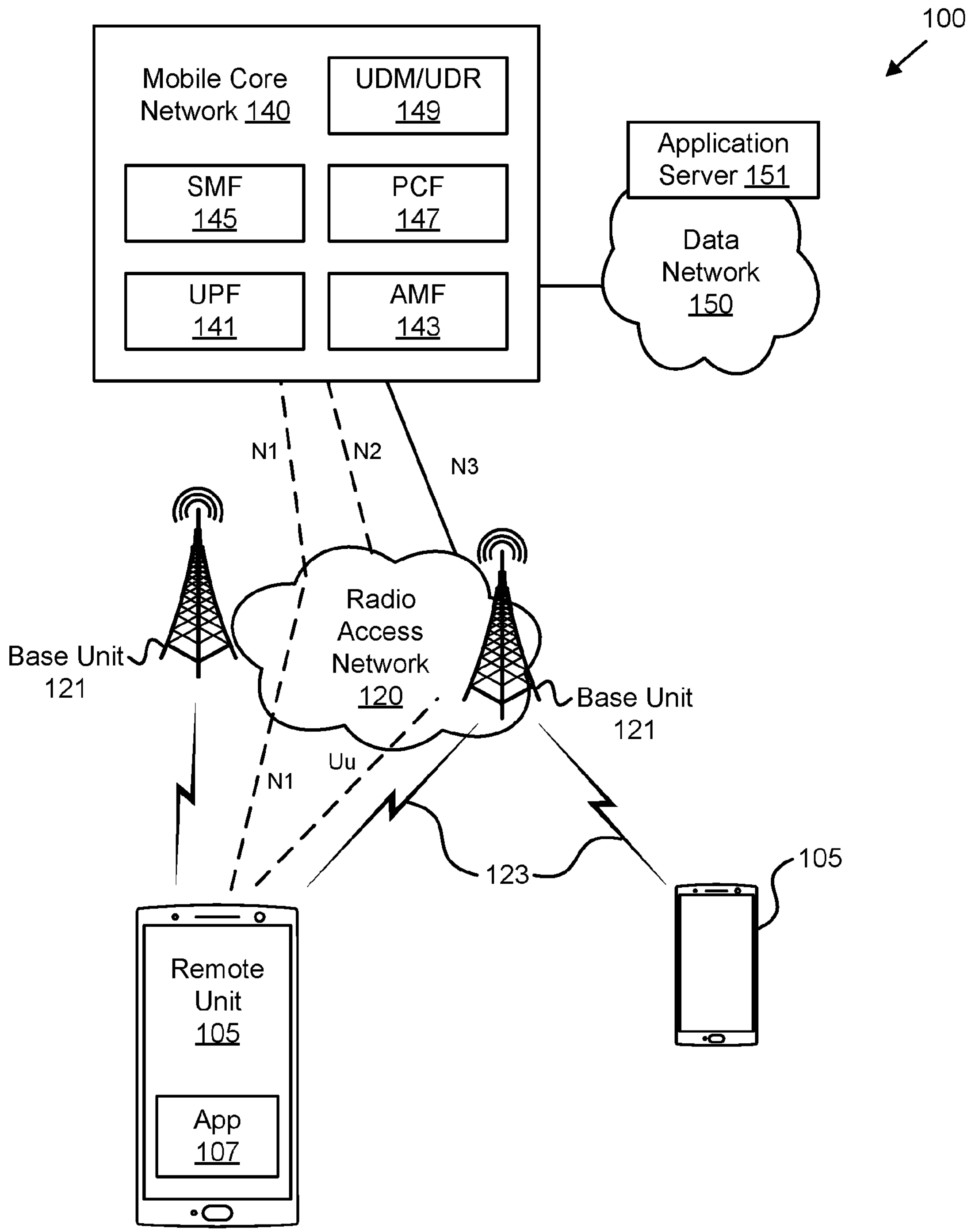
FIG. 1 is a block diagram illustrating one embodiment of a wireless communication system for configuring logical channel ("LCH") mapping restriction for small-data transmission ("SDT")

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for enabling a network to support uplink transmission for small data while the UE is in the RRC_INACTIVE state. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

As noted above, NR supports RRC_INACTIVE state and UEs with infrequent (periodic and/or non-periodic) data transmission are generally maintained by the network in the RRC_INACTIVE state. However so far, the RRC_INACTIVE state does not support the transmission of data. Hence, the UE has to resume the connection (i.e., move to RRC_CONNECTED state) for any downlink ("DL") (e.g., Mobile Terminating) and uplink ("UL") (e.g., Mobile Originating) data. If small-data transmission in the RRC_INACTIVE state is not supported, then the UE is required to setup an RRC connection (i.e., move to RRC_CONNECTED state) and subsequently be released to the RRC_INACTIVE state for each data transmission however small and infrequent the data packets are. This results in unnecessary power consumption and signaling overhead.

In various embodiments, small data transmission ("SDT") is supported while the UE is in RRC_INACTIVE state. In some embodiments, said UL small data transmissions are achieved using RACH-based schemes (i.e., 2-step and 4-step random access procedures). In one embodiment, user plane ("UP") data transmission for small data packets from the RRC_INACTIVE state uses, e.g., the MsgA (i.e., for 2-step random access procedure) or Msg3 (i.e., for 4-step random access procedure).

Random-Access Channel ("RACH") messaging may be modified to enable flexible payload sizes larger than the Rel-16 Common Control Channel ("CCCH") message size that is possible currently for the RRC_INACTIVE state for MsgA and Msg3 to support user plane data transmission in UL (actual payload size can be up to network configuration). In one embodiment, context fetch and data forwarding (with and without anchor relocation) may occur in RRC_INACTIVE state for RACH-based solutions.

In some embodiments, transmission of UL data on pre-configured Physical Uplink Shared Channel ("PUSCH") resources (i.e., reusing the configured grant type 1)—when the uplink Timing Alignment ("TA") is valid. In one embodiment, small data transmissions are achieved over configured grant ("CG") Type-1 resources from INACTIVE state. A UE may be configured with configured grant CG Type-1 resources for small data transmission in UL for INACTIVE state The present disclosure addresses the following two issues with small-data transmission when the UE is in the RRC_INACTIVE state:

First, the network may configure UEs in RRC_CONNECTED with LCH mapping restrictions, which are used during the logical channel prioritization ("LCP") procedure, i.e., Transport Block ("TB") generation procedure. Those mapping restrictions are used to control which LCHs can be mapped to a specific UL grant. When UE is moved to RRC_INACTIVE by the network, the UE stores the configured LCH mapping restrictions. However, for uplink transmissions in RRC_INACTIVE mode, i.e., small data transmission ("SDT") occurring, e.g., only on the initial UL Bandwidth Part ("BWP"), most of the LCH mapping restrictions are actually not suitable and would rather prohibit the UE from using the configured uplink resources for small data transmissions, e.g., mapping restrictions related to allowed Subcarrier Spacing ("SCS"), PUSCH duration and allowed serving cells.

Second, the network configures whether a LCH can be considered for small data transmission or not. Basically, there are SDT-LCHs and non-SDT LCH(s). While in RRC_INACTIVE performing SDT, the UE may also have data for non-SDT LCH available for transmission. Current 3GPP specifications do not support the transmission of data from non-SDT LCHs in RRC_INACTIVE without moving the UE to RRC_CONNECTED.

To support small-data transmission ("SDT") in the RRC_INACTIVE state, solutions are described below for supporting uplink transmission for small data while in RRC_INACTIVE state. According to a first solution, a UE may be configured with two sets of LCH mapping restrictions. The first set of LCH mapping restrictions is used for UL transmissions in RRC_CONNECTED. The second set of LCH mapping restrictions is used for UL transmission in RRC_INACTIVE (i.e., for small data transmission).

According a second solution, the UE autonomously disables/releases certain predefined LCH mapping restrictions when moving from RRC_CONNECTED to RRC_INACTIVE. According to another solution, the UE receives Downlink Control Information ("DCI") in RRC_INACTIVE state that explicitly indicates which LCHs are allowed to map data on the assigned uplink resources, e.g., only LCHs configured for SDT or also non-SDT LCHs. According to a further solutions, the configured grant for small-data transmission ("CG-SDT") configuration, e.g., signaled within the RRCRelease message with suspend configuration, indicates which LCHs are allowed to map data on the assigned uplink resources, e.g., only LCHs configured for SDT or also non-SDT LCHs.

FIG. 1 depicts a wireless communication system 100 for configuring LCH mapping restriction for SDT, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals carried over the wireless communication links 123. Furthermore, the UL communication signals may comprise one or more downlink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for configuring LCH mapping restriction for SDT apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base unit 121 but it is replaceable by any other radio access node, e.g., RAN node, BS, eNB, gNB, AP, etc. Additionally, the term "UE" is used for the mobile station/remote unit, but it is replaceable by any other remote device, e.g., remote unit, MS, ME, Customer Premise Equipment ("CPE"), etc. Further, the operations are described mainly in the context of 5G NR. However, the below described solutions/methods are also equally applicable to other mobile communication systems for configuring LCH mapping restriction for SDT.

Figure 2:
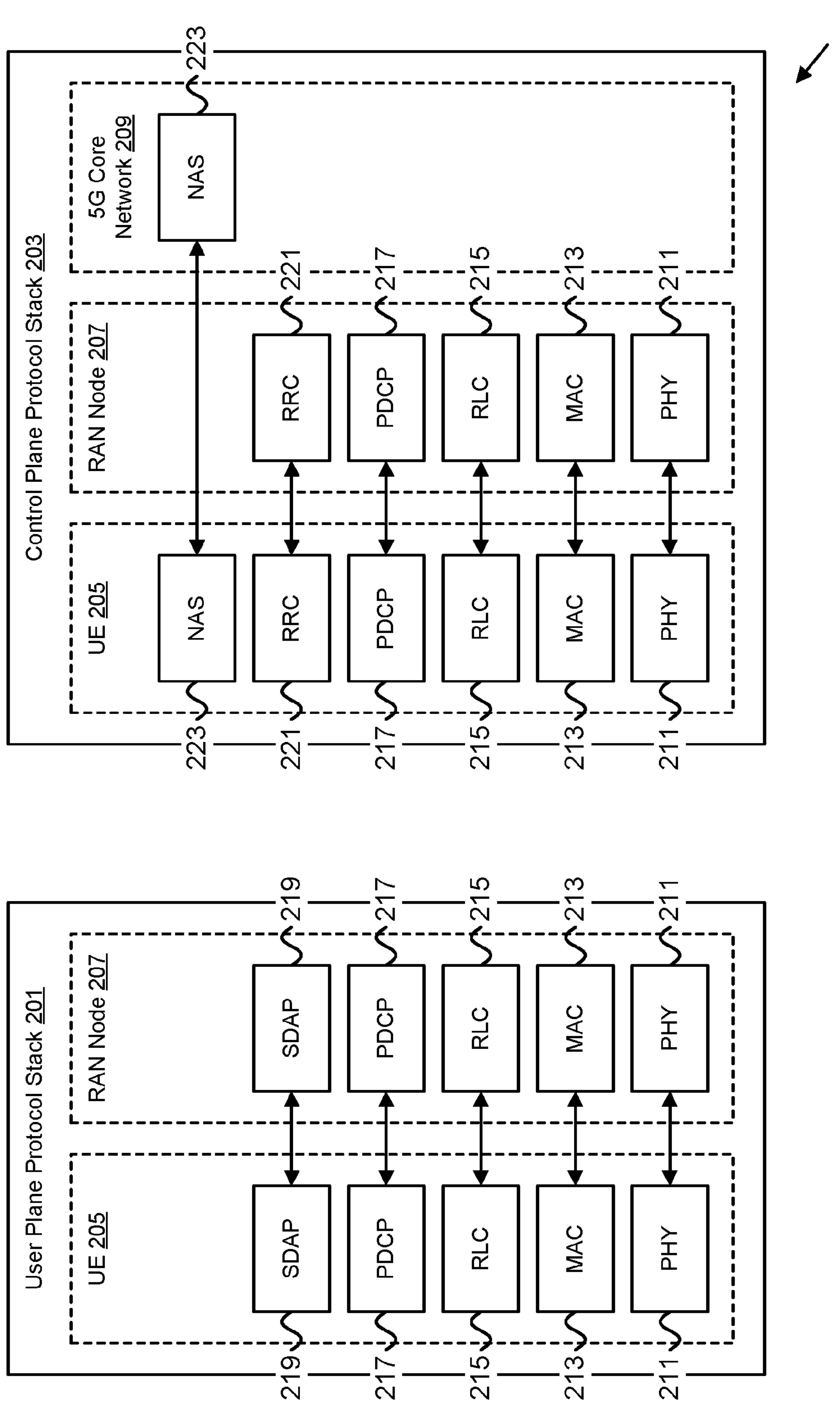
FIG. 2 is a block diagram illustrating one embodiment of a NR protocol stack.

FIG. 2 depicts a NR protocol stack 200, according to embodiments of the disclosure. While FIG. 2 shows a UE 205, a RAN node 207 (e.g., a gNB) and the 5G core network 209, these are representative of a remote unit 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 211, a Medium Access Control ("MAC") sublayer 213, the Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a physical layer 211, a MAC sublayer 213, a RLC sublayer 215, and a PDCP sublayer 217. The Control Place protocol stack 203 also includes a Radio Resource Control ("RRC") layer 221 and a Non-Access Stratum ("NAS") layer 223.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 221 and the NAS layer 223 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers."

The physical layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 offers QoS flows to the core network (e.g., 5GC 209). The RRC layer 221 provides for the addition, modification, and release of Carrier Aggregation and/or Dual Connectivity. The RRC layer 221 also manages the establishment, configuration, maintenance, and release of Signaling Radio Bearers ("SRBs") and Data Radio Bearers ("DRBs").

To remedy the above noted issues with small data transmission ("SDT") while the UE is in the RRC_INACTIVE state, in various embodiments, the remote unit 105 is configured with two sets of LCH mapping restrictions. In certain embodiments, the first set of LCH mapping restrictions is used for UL transmissions in RRC_CONNECTED. In certain embodiments, the second set of LCH mapping restrictions is used for UL transmission in RRC_INACTIVE (small data transmission).

The remote unit 105 may autonomously disables/releases certain predefined LCH mapping restrictions when moving from RRC_CONNECTED to RRC_INACTIVE. A UL DCI received in RRC_INACTIVE explicitly indicates which LCHs are allowed to map data on the assigned uplink resources, e.g., only LCHs configured for SDT or also non-SDT LCHs. A CG-SDT configuration, e.g., signaled within RRCRelease with suspend configuration, indicates which LCHs are allowed to map data on the assigned uplink resources, e.g., only LCHs configured for SDT or also non-SDT LCHs.

Figure 3:
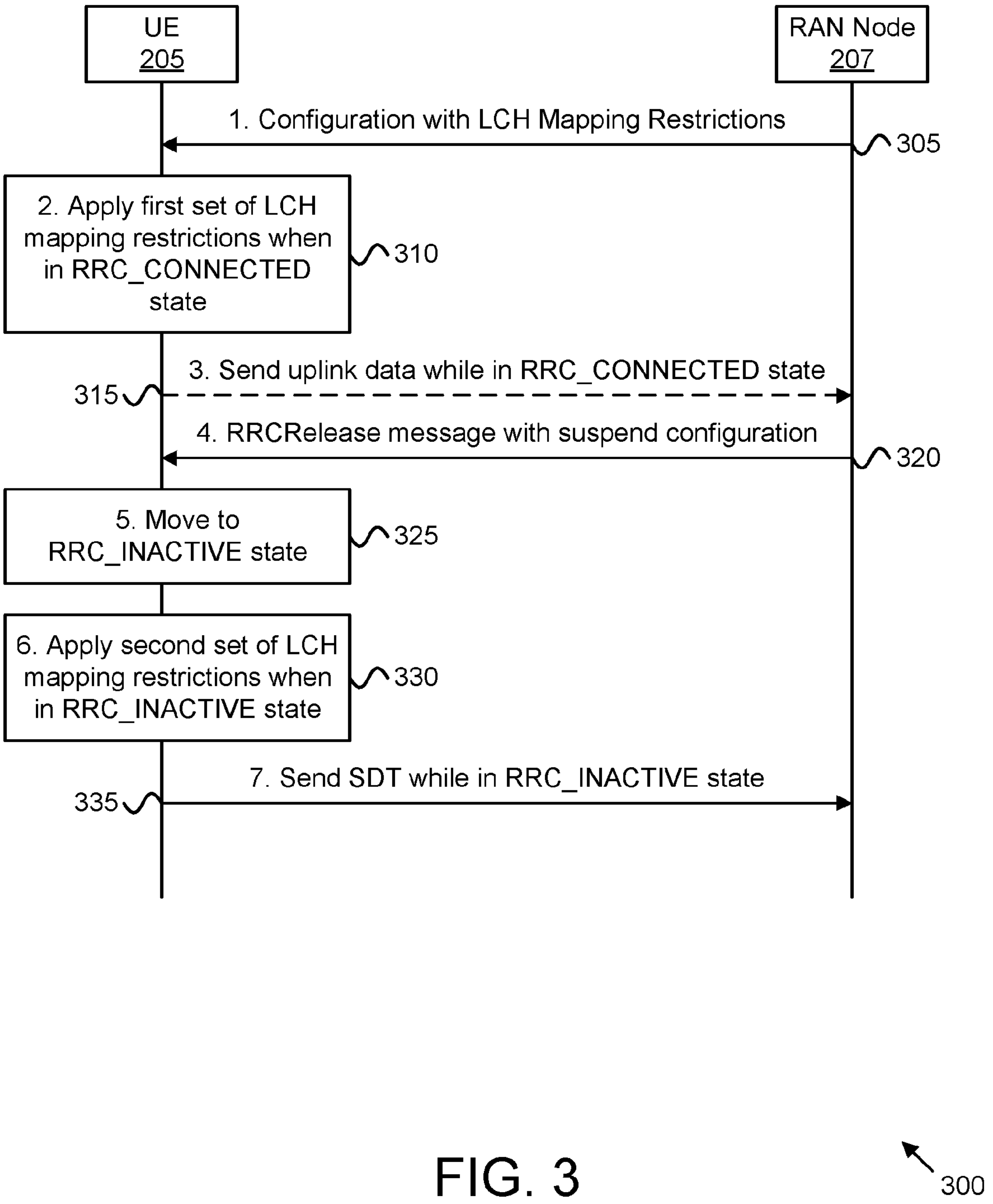
FIG. 3 is a call-flow diagram illustrating one embodiment of configuring LCH mapping restrictions for SDT.

FIG. 3 depicts exemplary message flow of a procedure 300 for configuring LCH mapping restriction for SDT, according to embodiments of the disclosure. The procedure 300 involves the UE 205, and the RAN node 207. The UE 205 may be an embodiment of the remote unit 105, while the RAN node 207 may be an embodiment of the base unit 121.

The procedure 300 begins at Step 1 as the RAN node 207 configures the UE 205 with logical channel ("LCH") mapping restrictions (see messaging 305). As used herein, a LCH mapping restriction refers to restrictions placed on a logical channel governing which resources (e.g., channels, component carriers, serving cells, subcarrier spacing ("SCS"), etc.) are allowed for traffic (e.g., data packets) of the logical channel (i.e., which resources the logical channel can be mapped to). In one example, the mapping restrictions for logical channels may be as specified in 3GPP Technical Specification ("TS") 38.321 and 3GPP TS 38.331.

At Step 2, the UE 205 applies a first set of LCH mapping restrictions for uplink transmission of data while the UE 205 is in the RRC_CONNECTED state (see block 310).

At Optional Step 3, the UE 205 sends uplink data while in the RRC_CONNECTED state (see messaging 315). Here, the generated uplink data corresponds to a logical channel and is mapped to uplink resources according to the first set of LCH mapping restrictions.

At Step 4, the RAN node 207 sends a RRC release message (RRCRelease) with suspend configuration (see messaging 320).

At Step 5, the RRCRelease message triggers the UE 205 to move to the RRC_INACTIVE state (see block 325).

At Step 6, the UE applies a second set of LCH mapping restrictions for uplink transmission of data while the UE 205 is in the RRC_INACTIVE state (see block 330).

At Step 7, the UE 205 sends uplink data while in the RRC_INACTIVE state (see messaging 335). Here, the generated uplink data corresponds to a logical channel and is mapped to uplink resources according to the second set of LCH mapping restrictions.

According to embodiments of a first solution, the UE is configured with a first set of LCH mapping restrictions for each Logical channel which are to be applied by the UE while being in RRC_CONNECTED and a second set of LCH mapping restrictions for each LCH which the UE applies for uplink transmissions in RRC_INACTIVE. The second set of LCH mapping restrictions is applied by the UE in RRC_INACTIVE for small data transmissions ("SDT"), i.e., transmitting data in RRC_INACTIVE without moving to RRC_CONNECTED.

The data transmission in RRC_INACTIVE may for example take place on preconfigured uplink resources, i.e., uplink configured grant(s) allocated for SDT which is also referred to as CG-SDT in the following. When moving from RRC_CONNECTED to RRC_INACTIVE, i.e., by RRCRelease message with suspend configuration, the UE may according to one implementation of this embodiment, implicitly release the first set of LCH restriction configurations and apply the second set of LCH restriction configuration. Accordingly, the LCH mapping restrictions of the second set are applied when performing the logical channel prioritization ("LCP") procedure for small data transmissions.

The UE (MAC entity) performs the LCP procedure when a new transmission is performed. RRC additionally controls the LCP procedure by configuring mapping restrictions for each logical channel.

- allowedSCS-List which sets the allowed Subcarrier Spacing(s) for transmission;
- maxPUSCH-Duration which sets the maximum PUSCH duration allowed for transmission;
- configuredGrantType1Allowed which sets whether a configured grant Type1 can be used for transmission;
- allow edServingCells which sets the allowed cell(s) for transmission;
- allow edCG-List which sets the allowed configured grant(s) for transmission;

allow edPHY-PriorityIndex which sets the allowed PHY priority index(es) of a dynamic grant for transmission.

The mapping restrictions for UL transmissions in RRC_CONNECTED state and for transmissions in RRC_INACTIVE state, e.g., UL transmission on CG-SDT resources or on the uplink resource assigned by the Random Access Response (Msg3) or MsgA, may differ substantially. For example, restrictions related to the allowed numerology (e.g., SCS) and PUSCH duration as well as the allowed serving cell(s) are not relevant/applicable for SDT transmission in RRC_INACTIVE since for example UL transmissions in RRC_INACTIVE may happen only on the initial UL BWP. On the other hand, the RAN node 207 may configure explicitly and control which of the configured LCHs are allowed to multiplex data on, e.g., CG resources configured for SDT transmissions in RRC_INACTIVE. Such LCH mapping restriction is only applicable for RRC_INACTIVE, i.e., no relevance for RRC_CONNECTED.

According to embodiments of the second solution, the UE autonomously disables/releases a set of configured LCH mapping restrictions for the configured LCHs when moving from RRC_CONNECTED to RRC_INACTIVE state, e.g., upon receiving RRCRelease with suspend configuration. According to one specific implementation, LCH mapping restrictions are not applied for UL transmissions in RRC_INACTIVE except, optionally, the LCH restriction that only LCH which are configured for SDT are allowed to multiplex data on an uplink resource used for SDT.

According to one implementation of the second solution, the UE may for example assume that data of the configured LCHs, e.g., LCHs which are allowed to multiplex data on an uplink CG configured for SDT, can be mapped to any serving cell, an uplink grant with any SCS or any PUSCH duration. Basically, the UE releases some or all of the LCH mapping restrictions which were configured for uplink transmissions in RRC_CONNECTED. It might be preconfigured or fixed in specifications which of the LCH mapping restrictions the UE can autonomously disable/release when moving from RRC_CONNECTED to RRC_INACTIVE.

According to a third solution, network configures the UE with an indication indicating whether a LCH mapping restriction configured for a LCH for RRC_CONNECTED is to be applied for RRC_INACTIVE. According to one implementation of this embodiment a Boolean parameter is used for each LCH mapping restriction in order to indicate whether the corresponding restriction is also to be applied by the UE in RRC_INACTIVE.

FIG. 4 depicts one example of a LogicalChannelConfig information element ("IE") 400 in ASN.1 format. When adding/reconfiguring a LCH, e.g., RLC bearer, the network may in the LogicalChannelConfig IE configure for each LCH mapping restriction a Boolean IE 405 (denoted as "allowedSDT-LCH") indicating if this restriction is also to be used be the UE in in RRC_INACTIVE, e.g., for small data transmissions.

In one specific implementation, this configuration, e.g., Boolean IE 405, is only signaled for Logical channels configured for SDT. The configuration may be also done when moving the UE from RRC_CONNECTED to RRC_INACTIVE, i.e., RRCRelease with suspend configuration.

According to embodiments of a fourth solution, the network configures the UE with an indication indicating whether the LCH mapping restrictions configured for UL transmission in RRC_CONNECTED shall be also applied for UL transmissions in RRC_INACTIVE, e.g., for small data transmissions. This configuration may be signaled by higher layer signaling, e.g., by one IE (Boolean) in an RRC message, which is applicable either for each of the configured LCHs or alternatively only for the LCHs configured for SDT.

In another implementation an UL DCI, i.e., PDCCH allocating uplink resources, indicates whether the LCH mapping restrictions configured for the LCHs shall be applied for the UL transmission on the corresponding assigned UL resources.

According to a fifth solution, the UE follows a first relative priority order when generating a TB in RRC_CONNECTED and follows a second priority order for the generation of a TB while being in RRC_INACTIVE. According to the priority order in current 3GPP specifications, MAC Control Elements ("CEs") are generally prioritized over data of DRBs/LCHs, i.e., MAC CEs except padding Buffer Status Report ("BSR") and MAC CE for Recommended bit rate query, are prioritized over data from LCHs.

However, for small data transmission in RRC_INACTIVE it may be important to transmit the data in an uplink resource, e.g., sensor data, rather than including MAC CEs in the TB which are used for an optimized scheduling procedure, like Power Headroom Report ("PHR") or BSR MAC CE. Therefore, according to the second solution, a second priority order is defined which is used for uplink transmissions in RRC_INACTIVE. In the second priority order, data from SDT-related LCHs may be prioritized over MAC CEs.

According to a sixth solution, UE does not maintain the token bucket variable Bj while being in RRC_INACTIVE. Note that the RRC entity controls the scheduling of uplink data by signaling for each logical channel: a priority (where an increasing priority value indicates a lower priority level), a prioritisedBitRate (which sets the Prioritized Bit Rate ("PBR")), and a bucketSizeDuration (which sets the Bucket Size Duration ("BSD")). The MAC entity maintains a variable Bj for each logical channel j. The variable Bj is to be initialized to zero when the related logical channel is established, and incremented by the product PBR×T before every instance of the LCP procedure, where T is the time elapsed since Bj was last incremented. However, the value of Bj can never exceed the bucket size, thus if the value of Bj would be larger than the bucket size of logical channel j, the value of Bj is instead set to the bucket size. The bucket size of a LCH is equal to PBR×BSD, where PBR and BSD are configured by upper layers.

According to one implementation of the sixth solution, the UE does not update the variable Bj upon moving to RRC_INACTIVE. Since the token bucket mechanism is used in RRC_CONNECTED in order avoid the starvation of low priority LCHs and it can be safely assumed that there is no starvation issue for uplink transmissions in RRC_INACTIVE, e.g., small data transmissions, there is no need to apply this mechanism in RRC_INACTIVE. Furthermore, the complexity of the UE can be reduced in RRC_INACTIVE when not being required to apply the token bucket mechanism during LCP procedure, e.g., maintain Bj and perform LCP procedure considering the bucket status of an LCH.

According to another specific implementation, UE releases Bj and potentially also prioritisedBitRate when moving to RRC_INACTIVE. Alternatively, the UE initializes Bj of the logical channels to zero when moving to RRC_INACTIVE. Here, the UE would only maintain Bj for example during a SDT session, e.g., the UE increments Bj by the product PBR×T before every instance of the LCP procedure, where T is the time elapsed since Bj was last incremented during the SDT session. According to another implementation of the sixth solution, the UE considers only the priority of a logical channel when performing LCP procedure for UL transmissions in RRC_INACTIVE, e.g., small data transmissions. Other parameters configured for a logical channel like Bj or prioritisedBitRate, which sets the Prioritized Bit Rate ("PBR"), are not considered during the LCP procedure.

During LCP procedure, the UE (i.e., MAC entity) allocates resources to the logical channels in the following steps:

Step 1: all the logical channels with Bj>0 are allocated resources in a decreasing priority order. This is the first round of the LCP procedure. Note that if the PBR of a radio bearer is set to "infinity," then the UE is to allocate resources for all the data that is available for transmission on the radio bearer before meeting the PBR of the lower priority radio bearer(s).

Step 2: the MAC entity decrements Bj by the total size of MAC Service Data Units ("SDUs") served to logical channel j in Step 1 (a negative value of Bj is possible).

As used, a service data unit ("SDU") is a unit of data that has been passed down from a higher layer (or sublayer) to a lower layer. A SDU is then encapsulated into the lower layer's protocol data unit ("PDU") and the process continues until reaching the lowest layer of the protocol stack, i.e., physical layer. Accordingly, a SDU is a set of data that is sent by a user of the services of a given layer, and is transmitted semantically unchanged to a peer service user. In contrast, the PDU specifies the data that will be sent to the peer protocol layer at the receiving end, as opposed to being sent to a lower layer.

Step 3: if any resources remain, all the logical channels are served in a strict decreasing priority order (regardless of the value of Bj) until either the data for that logical channel or the UL grant is exhausted, whichever comes first. This is the second round of the LCP procedure. Note that logical channels configured with equal priority should be served equally.

According to another aspect of the sixth solution, the UE prioritizes LCH(s) configured for SDT over LCHs not configured for SDT during UL transmissions in RRC_INACTIVE. According to one implementation, the UE may first allocate UL resource to the SDT-LCHs, i.e., LCHs configured for SDT, (in decreasing priority order) and after that the remaining UL resources, if any, are allocated among the non-SDT LCHs (in a descending priority order). Basically, the first round of the LCP procedure is done among the SDT-LCHs, and the second round of the LCP procedure is done considering the non-SDT LCHs.

According to a seventh solution, uplink DCI received in RRC_INACTIVE indicates whether the uplink resources can be used only by DRBs/LCHs which are configured by network for small data transmission or by all DRBs/LCHs including those LCHs which are not configured for small data transmission. According to one implementation of the seventh solution, a UE in RRC_INACTIVE may indicate to the network that there is uplink data available for transmission for LCHs which are not configured by network for small data transmission, i.e., non-SDT LCHs. Such indication may be for example done by a buffer status report sent on the CG resources configured for SDT.

In one specific implementation of the seventh solution, the UE may report two different buffer status information to network, i.e., one containing only buffer status information for SDT LCHs and another buffer status report indicating the buffer status for non-SDT LCHs. Based on such information, the network may issue a dynamic uplink grant, i.e., UL DCI, assigning uplink resources which can be also used by the UE for transmission of data of non-SDT LCHs.

In one implementation of the seventh solution, a field in the UL DCI indicates whether the uplink resources can be only used for SDT LCHs or also for non-SDT LCHs. Table 1 shows the fields of a DCI format 0_1, which is used for PUSCH scheduling. Here, the DCI format 0_1 is enhanced to include a field for indicating whether the uplink resources can be only used for SDT LCHs.

TABLE 1

| Field (Item) | Bits | Reference |
|---|---|---|
| Identifier for DCI formats | 1 | |
| Carrier indicator | 0 or 3 | |
| UL/SUL Indicator | 0, 1 | 0 - bit for UE not configured with Supplemental Uplink ("SUL") in the cell<br>1 - bit for UEs configured with SUL in the cell |
| Bandwidth part ("BWP") indicator | 0, 1, 2 | Determined by BandwidthPart-Configuration in higher layer message and 38.212 - Table 7.3.1.1.2-1 |
| Frequency domain resource assignment | Variable | Variable with Resource Allocation Type |
| Time domain resource assignment | 4 | Carries the row index of the items in pusch_allocationList in RRC<br>Number of Bit Length is determined by log(I, 2), where I is the number of elements in pusch_allocationList in RRC |
| Frequency Hopping Flag | 0, 1 | |
| Modulation and coding scheme ("MCS") | 5 | 38.214-6.1.4 (See this table) |
| New data indicator ("NDI") | 1 | |
| Redundancy version ("RV") | 2 | 0, 1, 2, 3 |
| Hybrid Automatic Repeat Request ("HARQ") process number | 4 | |
| 1st DL assignment index | 1, 2 | |
| 2nd DL assignment index | 0, 2 | |
| Transmit Power Control ("TPC") command for scheduled PUSCH | 2 | |
| Sounding Reference Signal ("SRS") resource indicator | Variable | Determined by RRC Parameter SRS-SetUse |

TABLE 1-continued

| Field (Item) | Bits | Reference |
|---|---|---|
| Precoding information and number of transmission layers (TPMI) | 0, 2, 3, 4, 5, 6 | Determined by ulTxConfig, Number of Antenna ports, PUSCH-tp, ULmaxRank |
| Antenna ports | 2, 3, 4, 5 | Determined by PUSCH-tp, DL-DMRS-configuration-type, DL-DMRS-configuration-max-len, Rank |
| SRS request | 2 | Table 7.3.1.1.2-24 |
| Channel State Information ("CSI") request | 0, 1, 2, 3, 4, 5, 6 | Determined by ReportTriggerSize in RRC message. See Configure Aperiodic Trigger section for the details. |
| Code Block Group ("CBG") transmission information | 0, 2, 4, 6, 8 | Determined by maxCodeBlockGroupPerTransportblock in RRC message |
| Phase Tracking Reference Signal to Demodulation Reference Signal ("PTRS - DMRS") Association | 0, 2 | Determined by UL-PTRS-present, PUSCH-tp in RRC Message |
| beta_offsetr Indicator | 0, 2 | 0 - if uci-on-PUSCH.dynamic = Not Configured<br>2 - otherwise, see Table 7.3.1.1.2-27 |
| Demodulation Reference Signal ("DMRS") Sequence Initialization | 0, 1 | 0 - if PUSCH-tp = Disabled<br>1 - if PUSCH-tp = Enabled |
| UL-SCH Indicator | 1 | 0 - UL-SCH shall not be transmitted on the PUSCH<br>1 - UL-SCH shall be transmitted on the PUSCH |
| SDT Indicator | 1 | Optional. Indicates whether the uplink resources can be only used for SDT LCHs or also for non-SDT LCHs |

According to one implementation of the seventh solution, for RRC_INACTIVE scheduling the BWP ID field in an UL DCI, e.g., DCI format 0_1, is reused to indicate whether the assigned uplink resource can be only used by SDT LCHs or also by non-SDT LCHs. Because there is most likely only one BWP used for SDT transmission in RRC_INACTIVE, e.g., initial UL BWP, there is no need to explicitly indicate the BWP ID within the UL DCI. Thus, the UE interprets the BWP ID field of a UL DCI differently depending on its RRC state.

Similarly, and according to another implementation of the seventh solution, the CSI request field can be reused in RRC_INACTIVE scheduling to indicate which LCHs are allowed to map data on the assigned uplink resources, e.g., only LCHs configured for SDT or only non-SDT LCHs or all configured LCHs having data available for transmissions. Because there are no CSI-RS configured for RRC_INACTIVE UEs, or at least UE does not perform any CSI-RS based measurements in RRC_INACTIVE state, there is no point in requesting a CSI report from an RRC_INACTIVE UE. Thus, the UE interprets the CSI request field of a UL DCI differently depending on its RRC state.

According to another implementation of the seventh solution, the HARQ process ID ("HPID") field, e.g., certain bits of the HPID field, are reused in RRC_INACTIVE scheduling in order to indicate which LCHs are allowed to map data on the assigned uplink resources. Since for small data transmission in RRC_INACTIVE state, not all of the 16 HARQ processes are used, e.g., most likely only one or two HARQ processes are used for small data transmission, some of the bits of the HPID field can be reused. Thus, the UE interprets the HPID field of a UL DCI differently depending on its RRC state.

According to one further embodiment of the seventh solution, an UL DCI received in RRC_INACTIVE state indicates which of the configured LCHs are allowed to map data to the corresponding allocated uplink resources. In one implementation, a bitmap is signaled within the DCI, where each of the bits of the bitmap corresponds to one of the configured LCHs. A bit of the bitmap set to '0' may indicate that UE is not allowed to map data of the corresponding LCH to the allocated Uplink resources. Consequently, a bit set to'1' indicates that the UE is allowed to map data of the corresponding LCH to the allocated Uplink resources.

According to embodiments of an eighth solution, the CG configuration used for small data transmission RRC_INACTIVE, e.g., also referred to as "CG-SDT," indicates which of the configured LCHs are allowed to map data on the configured grant uplink resources, e.g., whether UE is allowed to send data of LCHs/DRBs which are not configured for SDT or whether UE is only allowed to send data of LCHs/DRBs which are configured for SDT transmission.

FIG. 5 depicts one example of a rrc-ConfiguredUplinkConfig information element ("IE") 500 in ASN.1 format. According to one implementation of the eight solution, a new field may be added to the IE ConfiguredGrantConfig—used to configure uplink transmissions without dynamic grant—indicating which LCHs can be mapped to the CG-SDT resources. In the example below, the SDT-LCHonly field 505 indicates whether only data of LCHs configured for SDT is allowed to be mapped to the configured uplink grant resources or not. It should be noted that network may reconfigure the CG-SDT resources while the UE is performing SDT in RRC_INACTIVE state. It is one option that the RRCRelease message is used to reconfigure CG-SDT resources while UE is in RRC_INACTIVE. For example, the network may reconfigure the CG-SDT to allow that also LCH(s) which are not configured for SDT can map data on the configure grant resources.

According to embodiments of a ninth solution, a source RAN node provides information about configured uplink grant resources configured for small data transmission to a target RAN node in case of UE mobility. Because CG-SDT resources are only valid in the same serving cell, the CG-SDT are released when the UE moves/accesses a new cell.

A UE in RRC_INACTIVE may initiate a resume procedure when there is a need to transmit data. In this case, the UE transmits an RRC resume request that includes the UE identifier (provided by the (source) serving node to identify the UE's configuration repository) and a security token to verify the legitimacy of the resume request. If, however, the UE resumes in a cell served by a different RAN node due to mobility, that target node will retrieve the UE configuration from the serving (source) node based on the UE identifier.

According to one implementation of the ninth solution, the UE context/configuration fetched from the source node contains the (last) CG-SDT resource configuration of the UE. According to another implementation of the ninth solution, the source node may also provide some further statistics about the SDT use of the UE. Such statistics may include, for example, information on how often the SDT transmission configuration was used for regular transmission in RRC_INACTIVE or information on how often the UE triggered the legacy RESUME procedure in addition to the small data transmission. This information might help a target node to configure the device appropriately.

According to another aspect of the embodiment, the UE may indicate within the RESUME request message whether it has a preference for CG-SDT configuration, i.e., the UE requests the network for CG-SDT resources. Based on the UE indication and the context fetched from the source node, the network (e.g., RAN node 207) may decide to configure CG-SDT resources within the RRCRelease message, e.g., without bringing the UE to RRC_CONNECTED mode.

Figure 6:
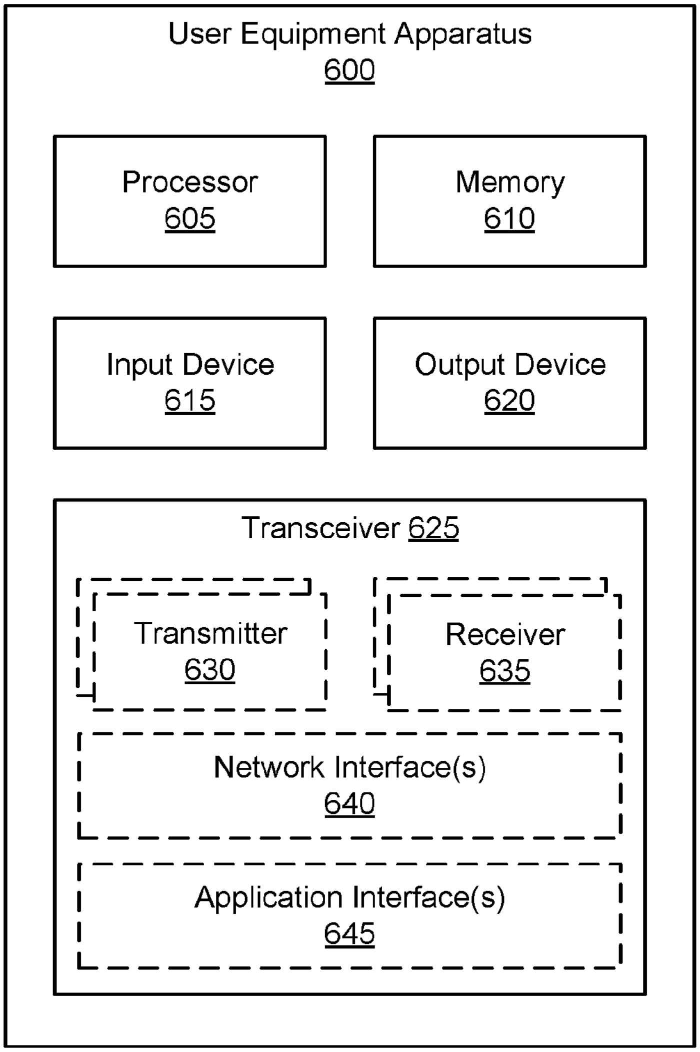
FIG. 6 is a block diagram illustrating one embodiment of a user equipment apparatus that may be used for configuring LCH mapping restriction for SDT.

FIG. 6 depicts a user equipment apparatus 600 that may be used for configuring LCH mapping restriction for SDT, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panels supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PC5, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In certain embodiments, the processor 605 may include an application processor (also known as "main processor") which manages application-domain and operating system ("OS") functions and a baseband processor (also known as "baseband radio processor") which manages radio functions.

In various embodiments, the processor 605 controls the transceiver 625 to receive a configuration with LCH mapping restrictions for an LCH. The processor 605 applies a first set of LCH mapping restrictions for UL transmissions when the apparatus 600 is in an RRC connected state (i.e., RRC_CONNECTED state) and applies a second set of LCH mapping restrictions for UL transmissions when the apparatus 600 is in a RRC inactive state (i.e., RRC_INACTIVE state), where the LCH mapping restrictions of the first set are different than the LCH mapping restrictions of the second set.

In some embodiments, the second set of LCH mapping restrictions is signaled within a RRC Release message (i.e., RRCRelease message) containing a suspend configuration. In some embodiments, the processor 605 performs small-data transmission while in the RRC inactive state, where the small-data transmission is made on one of: an UL resource of a configured grant (e.g., CG-SDT resources), an UL resource assigned during a random access procedure (i.e., in Msg3 or MsgA), and dynamic UL grants.

In certain embodiments, the second set of LCH mapping restrictions indicates a set of (i.e., one or more) LCHs that are configured for small-data transmission, where only those LCHs configured for small-data transmission are allowed to multiplex data on an UL resource. In certain embodiments, the processor 605 receives a configured grant configuration for small-data transmission (e.g., CG-SDT), where the configured grant configuration indicates which LCHs are allowed to map data onto UL resources of the configured grant while the apparatus 600 is in the RRC inactive state.

In some embodiments, receiving the configuration with LCH mapping restrictions includes receiving the first set of LCH mapping restrictions for a LCH and receiving the second set of LCH mapping restrictions for the LCH. In certain embodiments, the processor 605 receives an RRC release message containing a suspend configuration and moving from the RRC connected state to the RRC inactive state in response to the RRC release message. In such embodiments, the processor 605 releases the first set of LCH mapping restriction in response to moving from the RRC connected state to the RRC inactive state.

In some embodiments, the processor 605 receives an RRC release message containing a suspend configuration and moving from the RRC connected state to the RRC inactive state in response to the RRC release message. In such embodiments, the processor 605 autonomously disables the first set of LCH mapping restriction in response to moving from the RRC connected state to the RRC inactive state. In certain embodiments, the first set of LCH mapping restrictions comprises a predetermined set of the configured mapping restrictions (e.g., preconfigured or fixed in specifications).

In some embodiments, the configuration with LCH mapping restrictions includes an indication for each LCH mapping restriction indicating whether the LCH mapping restriction configured for a LCH for the RRC connected state is to be applied for the RRC inactive state. In some embodiments, the configuration with LCH mapping restrictions includes an indication for each LCH mapping restriction indicating whether the LCH mapping restriction configured for an UL transmission in the RRC connected state is to be applied in the RRC inactive state.

In some embodiments, the second set of LCH mapping restrictions prioritizes data of data radio bearers over MAC control elements. In certain embodiments, the second set of LCH mapping restrictions prioritizes a LCH configured for small-data transmission over a LCH not configured for small-data transmission.

In some embodiments, the processor 605 stops update of a token bucket related parameter associated with a LCH upon moving to the RRC inactive state. In some embodiments, the processor 605 initializes a token bucket related parameter to zero upon moving to the RRC inactive state. In some embodiments, the processor 605 receives DCI while the apparatus 600 is in the RRC inactive state, where the DCI indicates whether a LCH not configured for small-data transmission is allowed to map data onto an UL resource while the apparatus 600 is in the RRC inactive state.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to configuring LCH mapping restriction for SDT and/or mobile operation. For example, the memory 610 may store various parameters, panel/beam configurations, resource assignments, policies, and the like as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
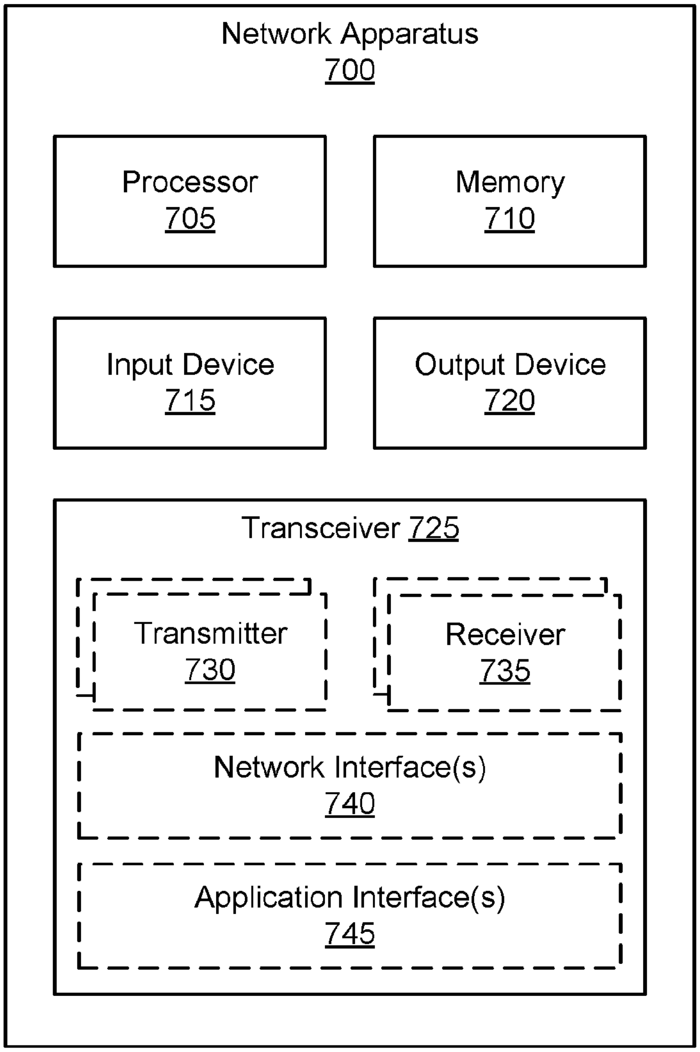
FIG. 7 is a block diagram illustrating one embodiment of a network apparatus that may be used for configuring LCH mapping restriction for SDT.

FIG. 7 depicts a network apparatus 700 that may be used for configuring LCH mapping restriction for SDT, according to embodiments of the disclosure. In one embodiment, network apparatus 700 may be one implementation of a RAN entity used to implement one or more of the above solutions. The network apparatus 700 may be one embodiment of the base unit 121 and/or RAN node 207, as described above. Furthermore, the network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 75. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 is a RAN node (e.g., gNB) that communicates with one or more UEs, as described herein. In such embodiments, the processor 705 controls the network apparatus 700 to perform the above described RAN behaviors. When operating as a RAN node, the processor 705 may include an application processor (also known as "main processor") which manages application-domain and operating system ("OS") functions and a baseband processor (also known as "baseband radio processor") which manages radio functions.

In various embodiments, the processor 705 controls the transceiver 725 to transmit, to a UE, a first set of LCH mapping restrictions for a LCH and transmits, to the UE, a second set of LCH mapping restrictions for the LCH. Here, the first set of LCH mapping restriction applies when the UE is in an RRC connected state (i.e., RRC_CONNECTED state) and the second set of LCH mapping restriction applies when the UE is in an RRC inactive state (i.e., RRC_INACTIVE state), where the LCH mapping restrictions of the first set are different than the LCH mapping restrictions of the second set. The transceiver 725 receives, from the UE, a small-data transmission while the UE is in the RRC inactive state.

In some embodiments, the processor 705 sends a RRC release message (i.e., RRCRelease) to the UE, where the RRC release message contains a suspend configuration and where the second set of LCH mapping restrictions is signaled within the RRC Release message. In some embodiments, the small-data transmission is made on one of: an UL resource of a configured grant (i.e., CG-SDT resources), an UL resource assigned during a random access procedure (i.e., in Msg3 or MsgA), and dynamic UL grants.

In certain embodiments, the second set of LCH mapping restrictions indicates a set of (i.e., one or more) LCHs that are configured for small-data transmission, where only those LCHs configured for small-data transmission are allowed to multiplex data on an UL resource. In certain embodiments, the processor 705 transmits a configured grant configuration for small-data transmission (i.e., CG-SDT), where the configured grant configuration indicates which LCHs are allowed to map data onto UL resources of the configured grant while the UE is in the RRC inactive state.

In some embodiments, the second set of LCH mapping restrictions prioritizes data of data radio bearers over MAC control elements. In certain embodiments, the second set of LCH mapping restrictions prioritizes a LCH configured for small-data transmission over a LCH not configured for small-data transmission. In some embodiments, the processor 705 transmits DCI while the UE is in the RRC inactive state, where the DCI indicates whether a LCH not configured for small-data transmission is allowed to map data onto an UL resource while the UE is in the RRC inactive state.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to configuring LCH mapping restriction for SDT and/or mobile operation. For example, the memory 710 may store parameters, configurations, resource assignments, policies, and the like, as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display.

In other embodiments, the output device 720 may be located near the input device 715. The transceiver 725 includes at least transmitter 730 and at least one receiver 735. One or more transmitters 730 may be used to communicate with the UE, as described herein. Similarly, one or more receivers 735 may be used to communicate with network functions in the Public Land Mobile Network ("PLMN") and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

Figure 8:
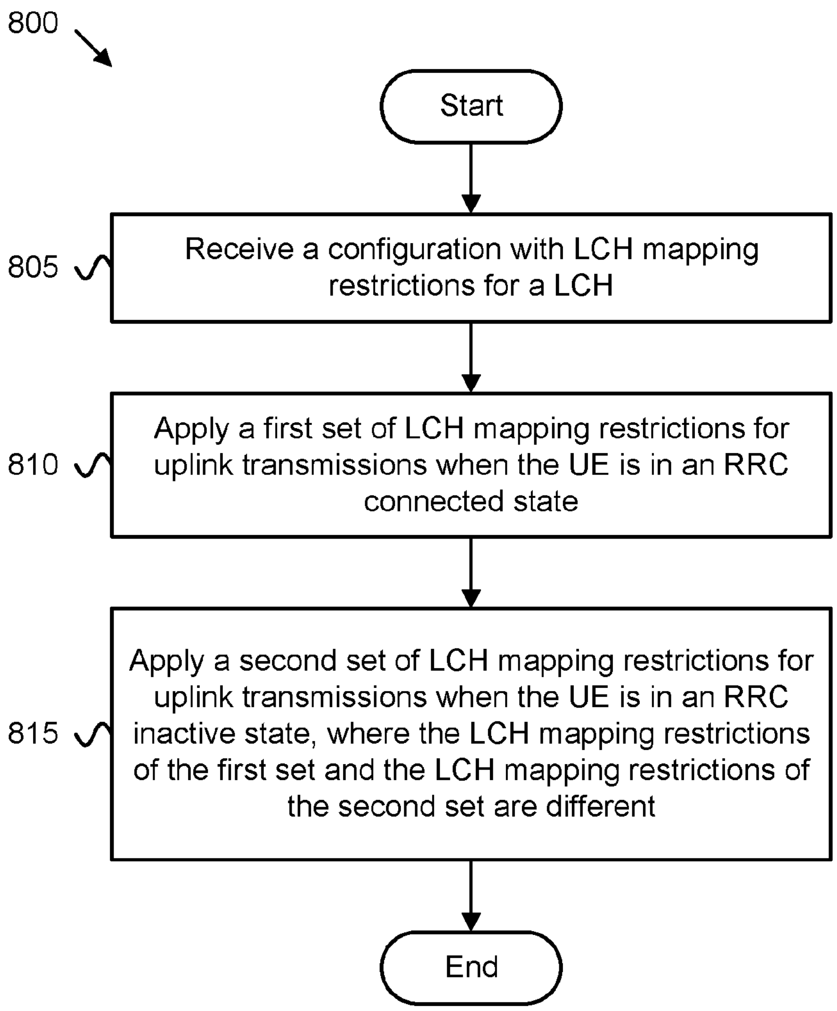
FIG. 8 is a flowchart diagram illustrating one embodiment of a first method for configuring LCH mapping restriction for SDT.

FIG. 8 depicts one embodiment of a method 800 for configuring LCH mapping restriction for SDT, according to embodiments of the disclosure. In various embodiments, the method 800 is performed by a UE, such as the remote unit 105, the UE 205, and/or the user equipment apparatus 600, described above as described above. In some embodiments, the method 800 is performed by a processor, such as a microcontroller, a microprocessor, a CPU, a GPU, an auxiliary processing unit, a FPGA, or the like.

The method 800 begins and receives 805 a configuration with LCH mapping restrictions for an LCH. The method 800 includes applying 810 a first set of LCH mapping restrictions for UL transmissions when the UE is in an RRC connected state. The method 800 includes applying 815 a second set of LCH mapping restrictions for UL transmissions when the UE is in an RRC inactive state, where the LCH mapping restrictions of the first set and the LCH mapping restrictions of the second set are different. The method 800 ends.

Figure 9:
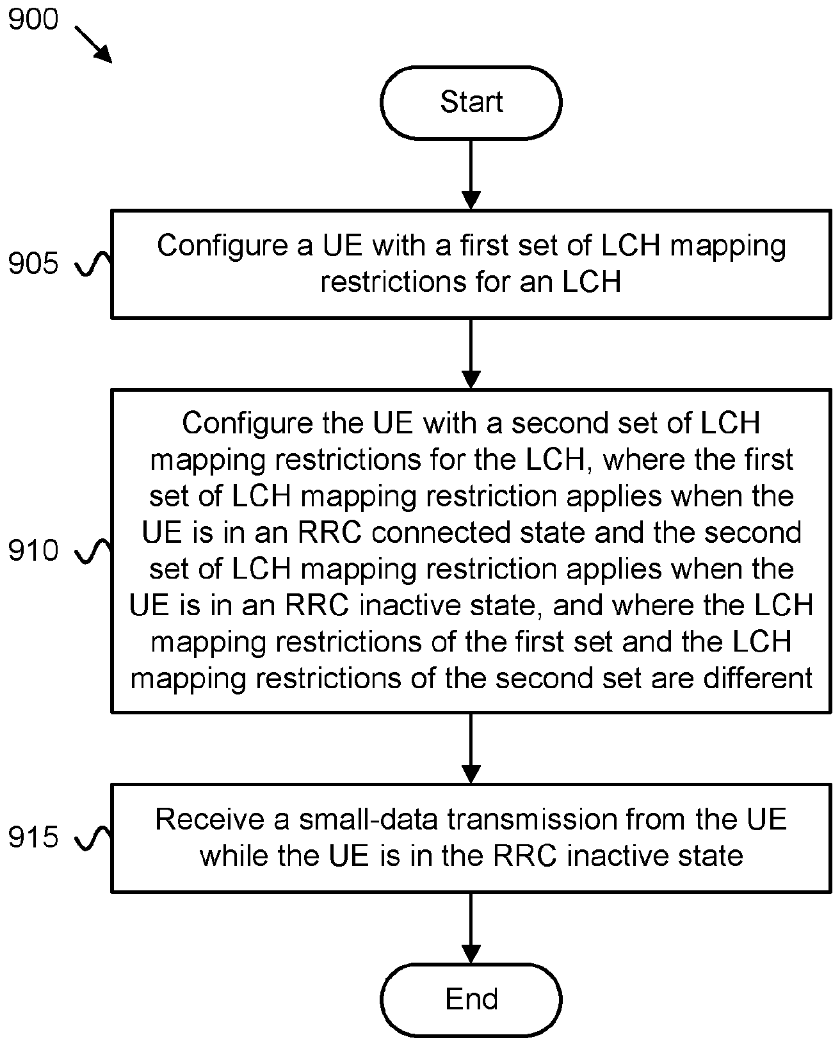
FIG. 9 is a flowchart diagram illustrating one embodiment of a second method for configuring LCH mapping restriction for SDT.

FIG. 9 depicts one embodiment of a method 900 for configuring LCH mapping restriction for SDT, according to embodiments of the disclosure. In various embodiments, the method 900 is performed by a RAN entity, such as the base unit 121, the RAN node 207, a gNB and/or the network apparatus 700, described above as described above. In some embodiments, the method 900 is performed by a processor, such as a microcontroller, a microprocessor, a CPU, a GPU, an auxiliary processing unit, a FPGA, or the like.

The method 900 begins and configures 905 a UE with a first set of LCH mapping restrictions for an LCH. The method 900 includes configuring 910 the UE with a second set of LCH mapping restrictions for the LCH. Here, the first set of LCH mapping restriction applies when the UE is in an RRC connected state and the second set of LCH mapping restriction applies when the UE is in an RRC inactive state, where the LCH mapping restrictions of the first set and the LCH mapping restrictions of the second set are different. The method 900 includes receiving 915 a small-data transmission from the UE while the UE is in the RRC inactive state. The method 900 ends.

Disclosed herein is a first apparatus for configuring LCH mapping restriction for SDT, according to embodiments of the disclosure. The first apparatus may be implemented by a UE, such as the remote unit 105, the UE 205, and/or the user equipment apparatus 600, described above. The first apparatus includes a processor and a transceiver that receives a configuration with logical channel mapping restrictions for a logical channel. The processor applies a first set of logical channel mapping restrictions for uplink transmissions when the first apparatus is in an RRC connected state and applies a second set of logical channel mapping restrictions for uplink transmissions when the first apparatus is in a RRC inactive state, where the logical channel mapping restrictions of the first set and the logical channel mapping restrictions of the second set are different.

In some embodiments, the second set of logical channel mapping restrictions is signaled within a RRC Release message containing a suspend configuration. In some embodiments, the processor performs small-data transmission while in the RRC inactive state, where the small-data transmission is made on one of: an uplink resource of a configured grant (e.g., CG-SDT resources), an uplink resource assigned during a random access procedure (i.e., in Msg3 or MsgA), and dynamic uplink grants.

In certain embodiments, the second set of logical channel mapping restrictions indicates a set of (i.e., one or more) logical channels that are configured for small-data transmission, where only the set of logical channels configured for small-data transmission are allowed to multiplex data on an uplink resource. In certain embodiments, the processor receives a configured grant configuration for small-data transmission (e.g., CG-SDT), where the configured grant configuration indicates which of the configured logical channels are allowed to map data onto uplink resources of the configured grant while the first apparatus is in the RRC inactive state.

In some embodiments, receiving the configuration with logical channel mapping restrictions includes receiving the first set of logical channel mapping restrictions for a logical channel and receiving the second set of logical channel mapping restrictions for the logical channel. In certain embodiments, the processor receives an RRC release message containing a suspend configuration and moving from the RRC connected state to the RRC inactive state in response to the RRC release message. In such embodiments, the processor releases the first set of logical channel mapping restriction in response to moving from the RRC connected state to the RRC inactive state.

In some embodiments, the processor receives an RRC release message containing a suspend configuration and moving from the RRC connected state to the RRC inactive state in response to the RRC release message. In such embodiments, the processor autonomously disables the first set of logical channel mapping restriction in response to moving from the RRC connected state to the RRC inactive state. In certain embodiments, the first set of logical channel mapping restrictions comprises a predetermined set of the configured mapping restrictions (e.g., preconfigured or fixed in specifications).

In some embodiments, the configuration with logical channel mapping restrictions includes an indication for each logical channel mapping restriction indicating whether the logical channel mapping restriction configured for a logical channel for the RRC connected state is to be applied for the RRC inactive state. In some embodiments, the configuration with logical channel mapping restrictions includes an indication for each logical channel mapping restriction indicating whether the logical channel mapping restriction configured for an uplink transmission in the RRC connected state is to be applied in the RRC inactive state.

In some embodiments, the second set of logical channel mapping restrictions prioritizes data of data radio bearers over MAC control elements. In certain embodiments, the second set of logical channel mapping restrictions prioritizes a logical channel configured for small-data transmission over a logical channel not configured for small-data transmission.

In some embodiments, the processor stops update of a token bucket related parameter associated with a logical channel upon moving to the RRC inactive state. In some embodiments, the processor initializes a token bucket related parameter to zero upon moving to the RRC inactive state. In some embodiments, the processor receives DCI while the apparatus is in the RRC inactive state, where the DCI indicates whether a logical channel not configured for small-data transmission is allowed to map data onto an uplink resource while the first apparatus is in the RRC inactive state.

Disclosed herein is a first method for configuring LCH mapping restriction for SDT, according to embodiments of the disclosure. The first method may be performed by a UE, such as the remote unit 105, the UE 205, and/or the user equipment apparatus 600, described above. The first method includes receiving a configuration with logical channel mapping restrictions for a logical channel and applying a first set of logical channel mapping restrictions for uplink transmissions when the UE is in an RRC connected state. The first method includes applying a second set of logical channel mapping restrictions for uplink transmissions when the UE is in an RRC inactive state, where the logical channel mapping restrictions of the first set and the logical channel mapping restrictions of the second set are different.

In some embodiments, the second set of logical channel mapping restrictions is signaled within a RRC Release message containing a suspend configuration. In some embodiments, the first method includes performing small-data transmission while in the RRC inactive state, where the small-data transmission is made on one of: an uplink resource of a configured grant (e.g., CG-SDT resources), an uplink resource assigned during a random access procedure (i.e., in Msg3 or MsgA), and dynamic uplink grants.

In certain embodiments, the second set of logical channel mapping restrictions indicates a set of (i.e., one or more) logical channels that are configured for small-data transmission, where only the set of logical channels configured for small-data transmission are allowed to multiplex data on an uplink resource. In certain embodiments, the first method includes receiving a configured grant configuration for small-data transmission (e.g., CG-SDT), where the configured grant configuration indicates which logical channels are allowed to map data onto uplink resources of the configured grant while the UE is in the RRC inactive state.

In some embodiments, receiving the configuration with logical channel mapping restrictions includes receiving the first set of logical channel mapping restrictions for a logical channel and receiving the second set of logical channel mapping restrictions for the logical channel. In certain embodiments, the first method includes receiving an RRC release message containing a suspend configuration and moving from the RRC connected state to the RRC inactive state in response to the RRC release message. In such embodiments, the first method further includes releasing the first set of logical channel mapping restriction in response to moving from the RRC connected state to the RRC inactive state.

In some embodiments, the first method includes receiving an RRC release message containing a suspend configuration and moving from the RRC connected state to the RRC inactive state in response to the RRC release message. In such embodiments, the first method further includes autonomously disabling the first set of logical channel mapping restriction in response to moving from the RRC connected state to the RRC inactive state. In certain embodiments, the first set of logical channel mapping restrictions comprises a predetermined set of the configured mapping restrictions (e.g., preconfigured or fixed in specifications).

In some embodiments, the configuration with logical channel mapping restrictions includes an indication for each logical channel mapping restriction indicating whether the logical channel mapping restriction configured for a logical channel for the RRC connected state is to be applied for the RRC inactive state. In some embodiments, the configuration with logical channel mapping restrictions includes an indication for each logical channel mapping restriction indicating whether the logical channel mapping restriction configured for an uplink transmission in the RRC connected state is to be applied in the RRC inactive state.

In some embodiments, the second set of logical channel mapping restrictions prioritizes data of data radio bearers over MAC control elements. In certain embodiments, the second set of logical channel mapping restrictions prioritizes a logical channel configured for small-data transmission over a logical channel not configured for small-data transmission.

In some embodiments, the first method includes stopping update of a token bucket related parameter associated with a logical channel upon moving to the RRC inactive state. In some embodiments, the first method includes initializing a token bucket related parameter to zero upon moving to the RRC inactive state. In some embodiments, the first method includes receiving DCI while the UE is in the RRC inactive state, where the DCI indicates whether a logical channel not configured for small-data transmission is allowed to map data onto an uplink resource while the UE is in the RRC inactive state.

Disclosed herein is a second apparatus for configuring LCH mapping restriction for SDT, according to embodiments of the disclosure. The second apparatus may be implemented by a RAN entity, such as the base unit 121, the RAN node 207, a gNB and/or the network apparatus 700, described above. The second apparatus includes a processor that controls a transceiver to transmit, to a UE, a first set of logical channel mapping restrictions for a logical channel and transmits, to the UE, a second set of logical channel mapping restrictions for a logical channel Here, the first set of logical channel mapping restriction applies when the UE is in an RRC connected state and the second set of logical channel mapping restriction applies when the UE is in an RRC inactive state, where the logical channel mapping restrictions of the first set and the logical channel mapping restrictions of the second set are different. The transceiver receives, from the UE, a small-data transmission while the UE is in the RRC inactive state.

In some embodiments, the processor sends a RRC release message to the UE, where the RRC release message contains a suspend configuration and where the second set of logical channel mapping restrictions is signaled within the RRC Release message.

In some embodiments, the small-data transmission is made on one of: an uplink resource of a configured grant (i.e., CG-SDT resources), an uplink resource assigned during a random access procedure (i.e., in Msg3 or MsgA), and dynamic uplink grants.

In certain embodiments, the second set of logical channel mapping restrictions indicates a set of (i.e., one or more) logical channels that are configured for small-data transmission, where only the set of logical channels configured for small-data transmission are allowed to multiplex data on an uplink resource.

In certain embodiments, the processor transmits a configured grant configuration for small-data transmission (i.e., CG-SDT), where the configured grant configuration indicates which of the configured logical channels are allowed to map data onto uplink resources of the configured grant while the UE is in the RRC inactive state.

In some embodiments, the second set of logical channel mapping restrictions prioritizes data of data radio bearers over MAC control elements. In certain embodiments, the second set of logical channel mapping restrictions prioritizes a logical channel configured for small-data transmission over a logical channel not configured for small-data transmission.

In some embodiments, the processor transmits DCI while the UE is in the RRC inactive state, where the DCI indicates whether a logical channel not configured for small-data transmission is allowed to map data onto an uplink resource while the UE is in the RRC inactive state.

Disclosed herein is a second method for configuring LCH mapping restriction for SDT, according to embodiments of the disclosure. The second method may be performed by a RAN entity, such as the base unit 121, the RAN node 207, a gNB, and/or the network apparatus 700, described above. The second method includes transmitting, to a UE, a first set of logical channel mapping restrictions for a logical channel and transmitting, to the UE, a second set of logical channel mapping restrictions for a logical channel Here, the first set of logical channel mapping restriction applies when the UE is in an RRC connected state and the second set of logical channel mapping restriction applies when the UE is in an RRC inactive state, where the logical channel mapping restrictions of the first set and the logical channel mapping restrictions of the second set are different. The second method includes receiving, from the UE, a small-data transmission while the UE is in the RRC inactive state.

In some embodiments, the second method includes sending a RRC release message to the UE, where the RRC release message contains a suspend configuration and where the second set of logical channel mapping restrictions is signaled within the RRC Release message.

In some embodiments, the small-data transmission is made on one of: an uplink resource of a configured grant (i.e., CG-SDT resources), an uplink resource assigned during a random access procedure (i.e., in Msg3 or MsgA), and dynamic uplink grants.

In certain embodiments, the second set of logical channel mapping restrictions indicates a set of (i.e., one or more) logical channels that are configured for small-data transmission, where only the set of logical channels configured for small-data transmission are allowed to multiplex data on an uplink resource.

In certain embodiments, the second method includes transmitting a configured grant configuration for small-data transmission (i.e., CG-SDT), where the configured grant configuration indicates which of the configured logical channels are allowed to map data onto uplink resources of the configured grant while the UE is in the RRC inactive state.

In some embodiments, the second set of logical channel mapping restrictions prioritizes data of data radio bearers over MAC control elements. In certain embodiments, the second set of logical channel mapping restrictions prioritizes a logical channel configured for small-data transmission over a logical channel not configured for small-data transmission.

In some embodiments, the second method includes transmitting DCI while in the RRC inactive state, where the DCI indicates whether a logical channel not configured for small-data transmission is allowed to map data onto an uplink resource while the UE is in the RRC inactive state.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment (UE) for wireless communication, comprising:
- at least one memory; and
- at least one processor coupled with the at least one memory and configured to cause the UE to:
  - receive a configuration indicating a plurality of logical channel (LCH) mapping restrictions for one or more LCHs;
  - apply a first set of LCH mapping restrictions of the plurality of LCH mapping restrictions, wherein the first set of LCH mapping restrictions is for uplink (UL) transmissions when the UE is in a Radio Resource Control (RRC) connected state;
  - receive an RRC Release message containing a suspend configuration indicating a second set of LCH mapping restrictions for the one or more LCHs, the RRC Release message indicating a set of LCHs that are configured for small-data transmission (SDT);
  - apply a third set of LCH mapping restrictions for the UL transmissions when the UE is in an RRC inactive state, wherein the third set of LCH mapping restrictions comprises a subset of the first set of LCH mapping restrictions and the second set of LCH mapping restrictions; and
  - multiplex data on an UL resource only from the set of LCHs configured for the SDT while the UE is in the RRC inactive state in accordance with the third set of LCH mapping restrictions.

2. The UE of claim 1, wherein the at least one processor is configured to cause the UE to perform, while in the RRC inactive state, a small-data transmission (SDT) using an UL resource of a configured grant, an UL resource assigned during a random access procedure, or an UL resource of a dynamic UL grant.

3. The UE of claim 2, wherein the at least one processor is configured to cause the UE to receive a configured grant configuration for the SDT, wherein the third set of LCH mapping restrictions indicates a set of configured LCHs that are allowed to map data onto UL resources of the configured grant while the UE is in the RRC inactive state.

4. The UE of claim 1, wherein to receive the configuration, the at least one processor is configured to cause the UE to:

receive the first set of LCH mapping restrictions for an LCH; and receive the second set of LCH mapping restrictions for the LCH.

5. The UE of claim 4, wherein the at least one processor is configured to cause the UE to:

receive an RRC release message containing a suspend configuration;

move from the RRC connected state to the RRC inactive state in response to the RRC release message; and release the first set of LCH mapping restriction in response to the move from the RRC connected state to the RRC inactive state.

6. The UE of claim 1, wherein the at least one processor is configured to cause the UE to:

receive an RRC release message containing a suspend configuration;

move from the RRC connected state to the RRC inactive state in response to the RRC release message; and disable the first set of LCH mapping restriction in response to the move from the RRC connected state to the RRC inactive state.

7. The UE of claim 6, wherein the first set of LCH mapping restrictions comprises a predetermined set of mapping restrictions.

8. The UE of claim 1, wherein the configuration comprises an indication for each LCH mapping restriction indicating whether the LCH mapping restriction configured for an LCH for the RRC connected state is to be applied for the RRC inactive state, and wherein the configuration further comprises an indication for each LCH mapping restriction indicating whether the LCH mapping restriction configured for an UL transmission in the RRC connected state is to be applied in the RRC inactive state.

9. The UE of claim 1, wherein the third set of LCH mapping restrictions prioritizes data of data radio bearers over Medium Access Control (MAC) control elements (MAC-CEs), and wherein the third set of LCH mapping restrictions prioritizes a first LCH configured the SDT over a second LCH not configured for the SDT.

10. The UE of claim 1, wherein the at least one processor is configured to cause the UE to:

stop an update of a token bucket related parameter associated with an LCH upon moving to the RRC inactive state; and initialize a token bucket related parameter to zero upon moving to the RRC inactive state.

11. The UE of claim 1, wherein the at least one processor is configured to cause the UE to receive downlink control information ("DCI") while in the RRC inactive state, and wherein the DCI indicates whether an LCH not configured for small-data transmission (SDT) is allowed to map data onto an UL resource while the UE is in the RRC inactive state.

12. A processor for wireless communication, comprising:

at least one controller coupled with at least one memory and configured to cause the processor to:

receive a configuration indicating a plurality of logical channel (LCH) mapping restrictions for one or more LCHs;

apply a first set of LCH mapping restrictions of the plurality of LCH mapping restrictions, wherein the first set of LCH mapping restrictions is for uplink (UL) transmissions when a user equipment (UE) is in a Radio Resource Control (RRC) connected state;

receive an RRC Release message containing a suspend configuration indicating a second set of LCH mapping restrictions for the one or more LCHs, the RRC Release message indicating a set of LCHs that are configured for small-data transmission (SDT);

apply a third set of LCH mapping restrictions for the UL transmissions when the UE is in an RRC inactive state, wherein the third set of LCH mapping restrictions comprises a subset of the first set of LCH mapping restrictions and the second set of LCH mapping restrictions; and multiplex data on an UL resource only from the set of LCHs configured for the SDT while the UE is in the RRC inactive state in accordance with the third set of LCH mapping restrictions.

13. A base station for wireless communication, comprising:

at least one memory; and at least one processor coupled with the at least one memory and configured to cause the base station to:

transmit, to a User Equipment (UE), a first set of logical channel (LCH) mapping restrictions for one or more first LCHs, wherein the first set of LCH mapping restriction is applicable for a Radio Resource Control (RRC) connected state;

transmit, to the UE, an RRC Release message containing a suspend configuration indicating a second set of LCH mapping restrictions for one or more second LCHs and indicating a set of LCHs that are configured for small-data transmission (SDT), wherein the second set of LCH mapping restriction is applicable for an RRC inactive state, wherein the second set of LCH mapping restrictions comprises a subset of the first set of LCH mapping restrictions and at least one additional LCH mapping restriction; and receive, from the UE while the UE is in the RRC inactive state, the SDT using a third set of LCH mapping restrictions comprising a subset of the first set of LCH mapping restrictions and the second set of LCH mapping restrictions, wherein the SDT multiplexes data only from the set of LCHs configured for the SDT in accordance with the third set of LCH mapping restrictions.

14. The base station of claim 13, wherein the at least one processor is configured to cause the base station to receive the SDT using an UL resource of a configured grant, an UL resource assigned during a random access procedure, or an UL resource of a dynamic UL grant.

15. The base station of claim 13, wherein the at least one processor is configured to cause the base station to transmit a configured grant configuration for SDT, wherein the second set of LCH mapping restrictions indicates a set of configured LCHs that are allowed to map data onto UL resources of the configured grant while the UE is in the RRC inactive state.

16. A method performed by a base station, the method comprising:

transmitting, to a User Equipment (UE), a first set of logical channel (LCH) mapping restrictions for one or more first LCHs, wherein the first set of LCH mapping restriction is applicable for a Radio Resource Control (RRC) connected state;

transmitting, to the UE, an RRC Release message containing a suspend configuration indicating a second set of LCH mapping restrictions for one or more second LCHs and indicating a set of LCHs that are configured for small-data transmission (SDT), wherein the second set of LCH mapping restriction is applicable for an RRC inactive state, wherein the second set of LCH mapping restrictions comprises a subset of the first set of LCH mapping restrictions and at least one additional LCH mapping restriction; and receiving, from the UE while the UE is in the RRC inactive state, the SDT using a third set of LCH mapping restrictions comprising a subset of the first set of LCH mapping restrictions and the second set of LCH mapping restrictions, wherein the SDT multiplexes data only from the set of LCHs configured for the SDT in accordance with the third set of LCH mapping restrictions.

* * * * *